United States Patent [19]

Erickson

[11] Patent Number: 5,437,146
[45] Date of Patent: Aug. 1, 1995

[54] FRUIT STRIPPING RAKES

[76] Inventor: Merritt C. Erickson, P.O. Box 32, Orland, Calif. 95963

[21] Appl. No.: 120,776

[22] Filed: Sep. 15, 1993

[51] Int. Cl.⁶ ............................................. A01D 46/24
[52] U.S. Cl. ........................................ 56/330; 56/332; 56/400.16
[58] Field of Search .................. 56/332, 330, 333, 335, 56/340.1, 400.11, 400.16, 400.2

[56] References Cited

U.S. PATENT DOCUMENTS

| 425,299 | 4/1890 | Carpenter et al. | 56/330 |
| 3,522,697 | 8/1970 | Shaff. | |
| 4,357,790 | 11/1982 | Tyros | 56/328.1 |
| 4,611,461 | 9/1986 | Tyros | 56/330 X |
| 4,986,065 | 1/1991 | Compton | 56/340.1 |
| 5,099,637 | 3/1992 | Drusiani | 56/332 |

Primary Examiner—Terry Lee Melius

[57] ABSTRACT

An apparatus for harvesting olives and like fruit, including the use of opposing rake members on extended supports. The rake members, which include extending tines, are arranged and powered to oscillate during the harvesting process. The opposing and oscillating rake members engage a group of small tree branches and maintain the fruit bearing branches properly placed as the tines of the rakes oscillate up and down to strip the fruit from the branches. The rake members are drawn through the branches in order to access all of the fruit. The rake members may be attached to a single hand-held extension pole, or may be attached on the end of a pivotally mounted extended support connected to a harvesting vehicle having capabilities for catching and boxing the fruit as it falls from the tree.

2 Claims, 4 Drawing Sheets

FRUIT STRIPPING RAKES

BACKGROUND OF THE INVENTION

1. Field of the Invention

This invention relates to the mechanized harvesting of fruit such as olives and the like. The present invention includes the use of opposing and oscillating rake members provided with tines on extended supports for reaching high into trees. The opposing and oscillating rake members engage a group of small branches and maintain the branches properly placed as the tines of the rakes move under power to strip the fruit from the branches.

2. Description of the Prior Art

The harvesting of olives, and certain other fruits such as cherries and oranges, has mainly been traditionally performed by hand picking, which is a lengthy and thus costly process. As an alternative to hand picking of fruit such as olives, main trunk and limb shakers have been tried with limited success. Main trunk and limb shakers are mechanical devices (machines) which clamp onto the main trunk or main branches of a tree and then vibrate the trunk and thus entire tree or main branch to such a degree that the fruit is shaken off and falls. Trunk or main branch shakers function well with certain varieties of trees such as almonds and pistachios, but do not function well with other varieties such as olives. Olive trees have delicate bark and cambium layers and very brittle limbs compared to almond trees, and additionally, depending upon the age of the olive tree, may have a main trunk having a substantial diameter. Therefore, main trunk or main limb shakers are either damaging to the tree or ineffective for the harvesting of olives. A main trunk or main limb shaker is disclosed in U.S. Pat. No. 4,986,065 for Agricultural Harvester, issued to Ira Compton on Jan. 22, 1991.

As an alternative to hand picking, or the use of main trunk/branch shakers for the picking of fruit such as olives, cherries and other fruits, other types of mechanized pickers have been developed using oscillating rakes having extending tines, and mounted on the end of short handles or long poles which are operated from ground level. One such device is illustrated in U.S. Pat. No. 4,357,790, issued to J. C. Tyros on Nov. 9, 1982. The Tyros method and apparatus for picking olives or other fruits, includes a power actuated fingered picking head mounted on the upper end of an elongated handled pole which is manipulated from ground level. The picking head has a built-in hopper with a bottom discharge opening for directing the olives to a ground level receptacle. The hopper is mounted with a power rotated rake-like member having right angular hooked tines which rake the fruit off of the branches and into the hopper. Because the Tyros device utilizes powered moving finger-like extensions mounted on the end of a long support shaft, the Tyros U.S. Pat. No. 4,357,790 is herein incorporated by reference.

Another tool for olive picking is illustrated in U.S. Pat. No. 5,099,637, issued to Franco Drusiani on Mar. 31, 1992. The Drusiani olive picking tool includes an elongated handle having a pneumatic actuator which operates a swinging or pivotal comb provided with tines. The tines are pulled through the branches of the tree and the swinging comb dislodges the fruit, and because of these features, this patent, U.S. Pat. No. 5,099,637, is herein incorporated by reference.

Another fruit stripping tool called "Device for Picking Fruit" was issued as a patent to E. H. Shaff on Aug. 4, 1970 as U.S. Pat. No. 3,522,697. The Shaff fruit picker is a short handled fingered-hand having motor driven oscillating fingers for stripping fruit from trees and bushes. The Shaff device uses soft resilient tines or fingers intended not to damage the fruit, and which are replaceable when worn, and because of these features, the Shaff U.S. Pat. No. 3,522,697 is herein incorporated by reference.

A major disadvantage of the relevant prior art devices mentioned above which use moving tines on rakes, involves the effectiveness of the combs or rakes themselves. It has been found that attempting to insert a single individual rakes into a branch often results in merely pushing the branch away from the rake due to one or more tines hanging up on smaller sections of the branch. The intended purpose of the tines or fingers of the rake is to be inserted between the smaller sections of the branch where the tines are "raked" through the leaves, small branches and fruit. To effectively harvest the fruit from the branches, the tines of the combs or rakes must penetrate interior of the branches where a large portion of the fruit is located. The use of a single rake-like picker having oscillating fingered extensions has the major drawback of having the tendency to push the branches away from the rake-like picking hand. When the tines of the rakes do not penetrate the branches of the trees, then several attempts must be made to accomplish this task or much of the fruit will be left unharvested. These successive attempts are time consuming and therefore costly.

SUMMARY

The present invention uses opposingly positioned powered oscillating rake members having extending tines to strip fruit from branches. The rake members are used in groups or pairs cooperative with one another in order to stabilize branches or small clusters of branches for more effective stripping of the fruit. The rake members are preferably attached to and supported on elongated supports so that relatively high branches may be reached from the ground. The rake members are preferably positioned somewhat perpendicular to the lengthwise axis of the elongated supports, and facing one another, or in opposition to one another with the extending tines of one rake aiming or extending generally toward the tines of the other rake. Preferably, a hinged or moveable joint in a portion of the support of one of the rake members allows the outward and inward movement of the rakes relative to one another and a small cluster of fruit bearing branches. This allows the rake members to be spread apart and be positioned on differing sides of a fruit bearing branch, and then moved inward inserting the tines into the cluster of branches and foliage to access the fruit. The cluster of branches can not then be pushed away from either rake since they are contained between the rakes. Once the rakes are positioned on differing sides of the cluster of branches, the oscillating rakes are then pulled downward (raked) through the branches knocking the fruit off with the vibrating or oscillating motion of the tines. The smaller branches feed through the tines of the rake as the fruit is gently knocked off. The opposing rake members help to hold the small branches in a relatively stable position, instead of pushing them off to one side as would result with a single rake member. This system of harvesting is particularly suited to olives, although not limited thereto, since the section of the branches containing olives are relatively thin and hang downward when loaded with fruit.

The rake members can be affixed to an elongated support arm which includes a handle configuration for manual use, wherein power would be provided by a portable power source transportable through an orchard. The elongated supports of the rake members may also be mounted to motor driven vehicles having catch platforms used to catch the falling fruit and direct it into hoppers on or towed by the vehicles. One such vehicle arrangement capable of catching fruit as it falls from a tree, and directing the fruit into hoppers or boxes is disclosed in the U.S. Pat. No. 4,986,065 for Agricultural Harvester, issued to Ira Compton on Jan. 22, 1991. The Compton harvester with only little modification, such as elimination of the trunk shaker, would function well in conjunction with the opposing rakes of the present invention, and therefore the Compton U.S. Pat. No. 4,986,065 is herein incorporated by reference.

The clear advantage of the present invention over the prior art is that the opposing rakes not only save time during harvesting, but are relatively non-damaging to the trees and fruit. The present invention therefore overcomes the previously mentioned disadvantages of the prior art and provides new and useful advantages in the harvesting of fruit from trees.

BEST MODES FOR CARRYING OUT THE INVENTION

Figure 1:
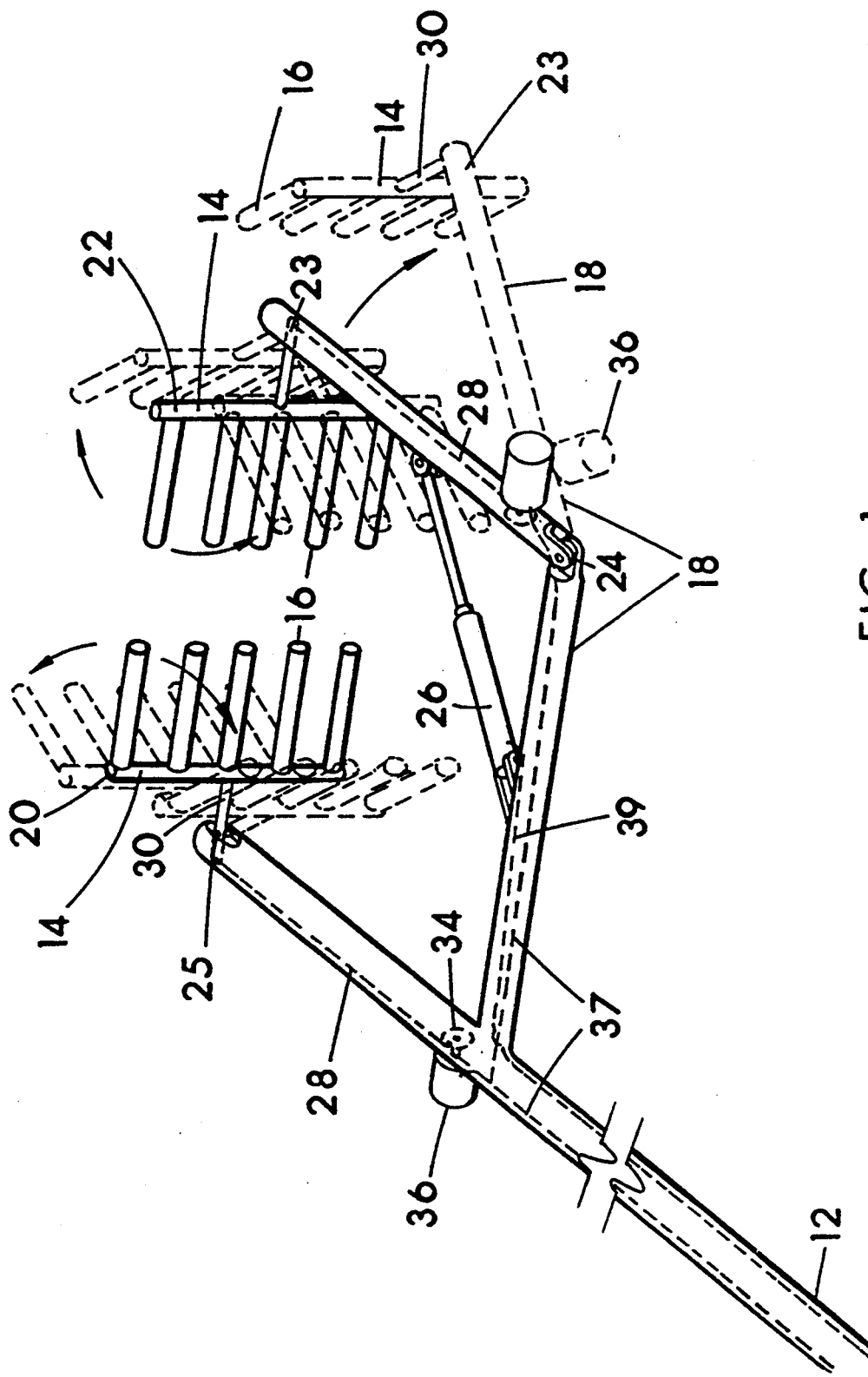
FIG. 1 is a view of the upper end of an elongated support arm showing two opposing rakes affixed thereto.
Figure 2:
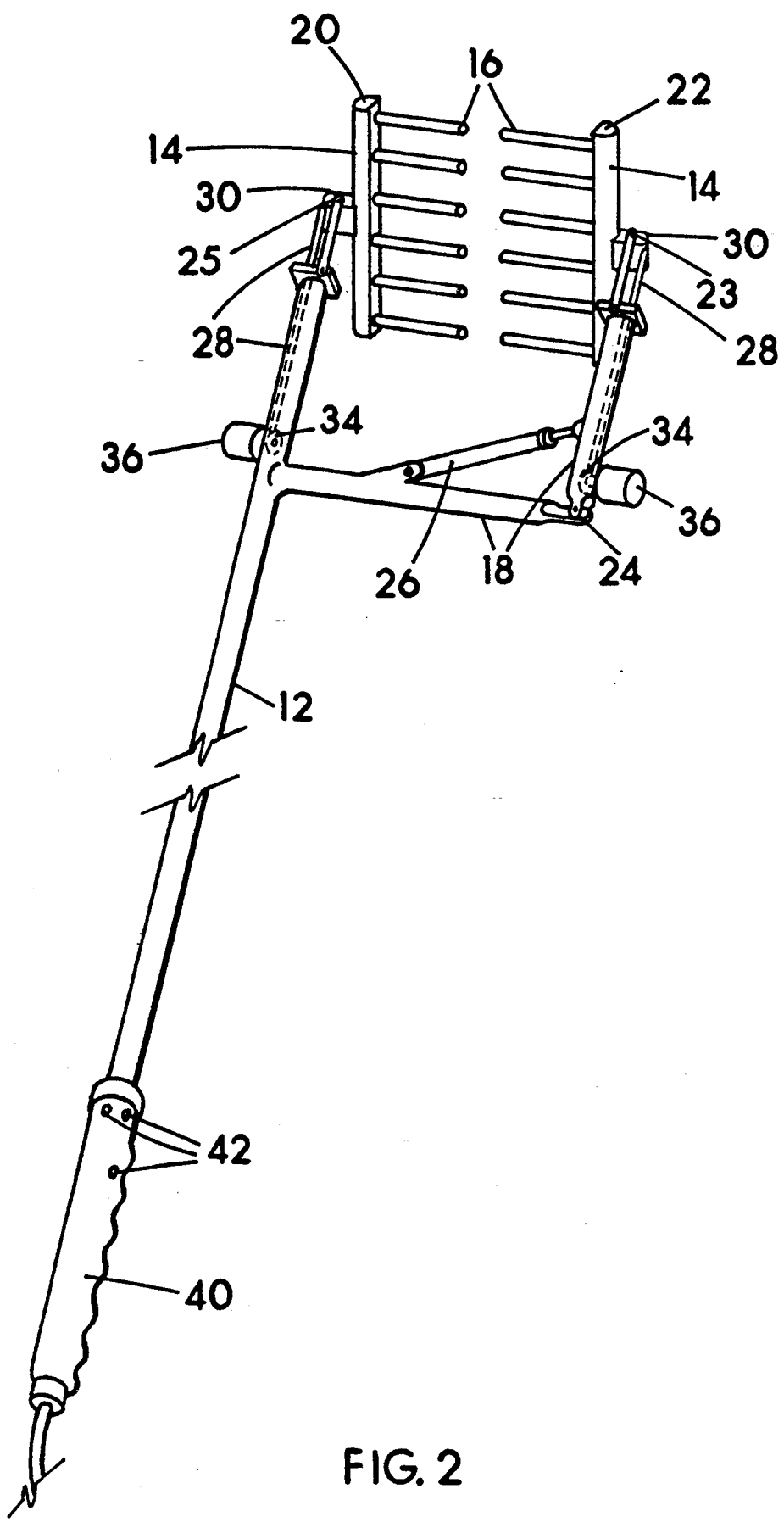
FIG. 2 illustrates a hand-held embodiment of the present invention.

Reference is now made to the drawings of FIGS. 1 through 4, which should be taken in conjunction with the patents included herein by reference. One form of the present invention, particularly as shown in FIGS. 1 and 2, includes an elongated support rod 12 affixed on a first end with two opposing rake members 20 and 22. Support rod 12 could be telescopic if desired. First rake member 20 and second rake member 22 are each basically comprised of a row of spaced apart tines 16 affixed perpendicularly to tine support bar 14. Tines 16 may be covered with a cushioned material to prevent damage to the fruit, and may be detachable from bar 14 for the ready replacement thereof. In FIGS. 1 and 2, support rod 12, adjacent the first end thereof, has an affixed extension arm 18, which is L-shaped in the example shown. The second rake member 22 is pivotally attached at moveable joint 23 to a distal end of extension arm 18. The first rake member 20 is pivotally attached at moveable joint 25 to the first end of the elongated support rod 12. Both rakes 20 and 22 are preferably positioned generally perpendicular to the lengthwise axis of support rod 12 and are facing one another with the tines 16 of one rake extending generally in the direction of the tines 16 of the other rake, or are in opposition to one another.

A moveable joint 24 is incorporated into L-shaped extension arm 18, and this allows the movement of the second rake member 22 toward and away from the first rake member 20 with the use of a lineal extendable and retractable actuator 26 or similar controlled powering arrangement capable of moving the second rake member 22 toward and away from the first rake 20. Actuator 26 may be electric, pneumatic or hydraulic, and needs to be readily controllable by the operator, such as with control buttons. Actuator 26 would need to be pivotally connected at each opposite end thereof to allow for the angular changes as it is shortened and lengthened. I have considered actuator 26 might be replaced with an extension spring biasing the rake members 20 and 22 toward one another, and a manual pull cable might be used to manually spread second rake 22 apart from rake member 20 for placing the rakes on differing sides of branches.

When the rake members 20 and 22 are brought toward one another and in close proximity to one another, the tines 16 may be positioned to abut or nearly abut the ends of the tines of one rake member against the ends of the tines 16 of the opposing rake member, or the tines 16 may be offset sideways relative to the tines 16 of the opposing rake so that the tines of one rake member move in between the tines of the opposing rake. Either arrangement will function within the scope of the invention.

The pivotal or oscillating movements in the rakes 20 and 22 and thus the tines 16 may be accomplished with the use of rigid rods 28 affixed to the distal ends of small support rods 30 to which tine support bars 14 are affixed. Support rods 30 are pivotally connected to support rod 12 or extension rod 18, between the rods 12 and 18 and the adjacent tine support bar 14. The other ends of the rods 28 would be affixed eccentrically to wheels 34. One rod 28, wheel 34, and motor 36 could be used per each rake member. Motors 36 attached to support rod 12 and extension rod 18 could be used to rotate each wheel 34. Each wheel 34 could be rotated by a motor 36, and the rotation of wheels 34 would pull support rods 30 up and down via up and down movement of rods 28 thus pivoting rakes 20 and 22 quickly up and down. Motors 36 could be electric, hydraulic, pneumatic, or internal combustion driven, however, the movement in the rake members 20 and 22 and thus the tines 16 may be accomplished via any suitable arrangement including any of those shown and described in any of the relevant prior art. Power lines or hoses 37 to feed motors 36 may be routed through support rod 12, as well as power lines or hoses 39 feeding actuator 26. Two or more motors 36 may be controlled together, but actuator 26 should have dedicated controls separate from motors 36.

The embodiment of the present invention shown in FIG. 2 includes a handle 40 incorporated into the bottom or second end of support rod 12, opposite the rakes 20 and 22. A number of control buttons 42 are affixed on handle 40 for the operation control of various functions including the on/off control of the oscillation of the rakes (motors 36), varying the speed of the oscillations if desired, and for manipulation of lineal extendable actuator 26 for toward and away movement of the second rake member 22 relative to the first rake 20. The hand held embodiment shown in FIG. 2 is shown in use held by a person in FIG. 4.

Figure 3:
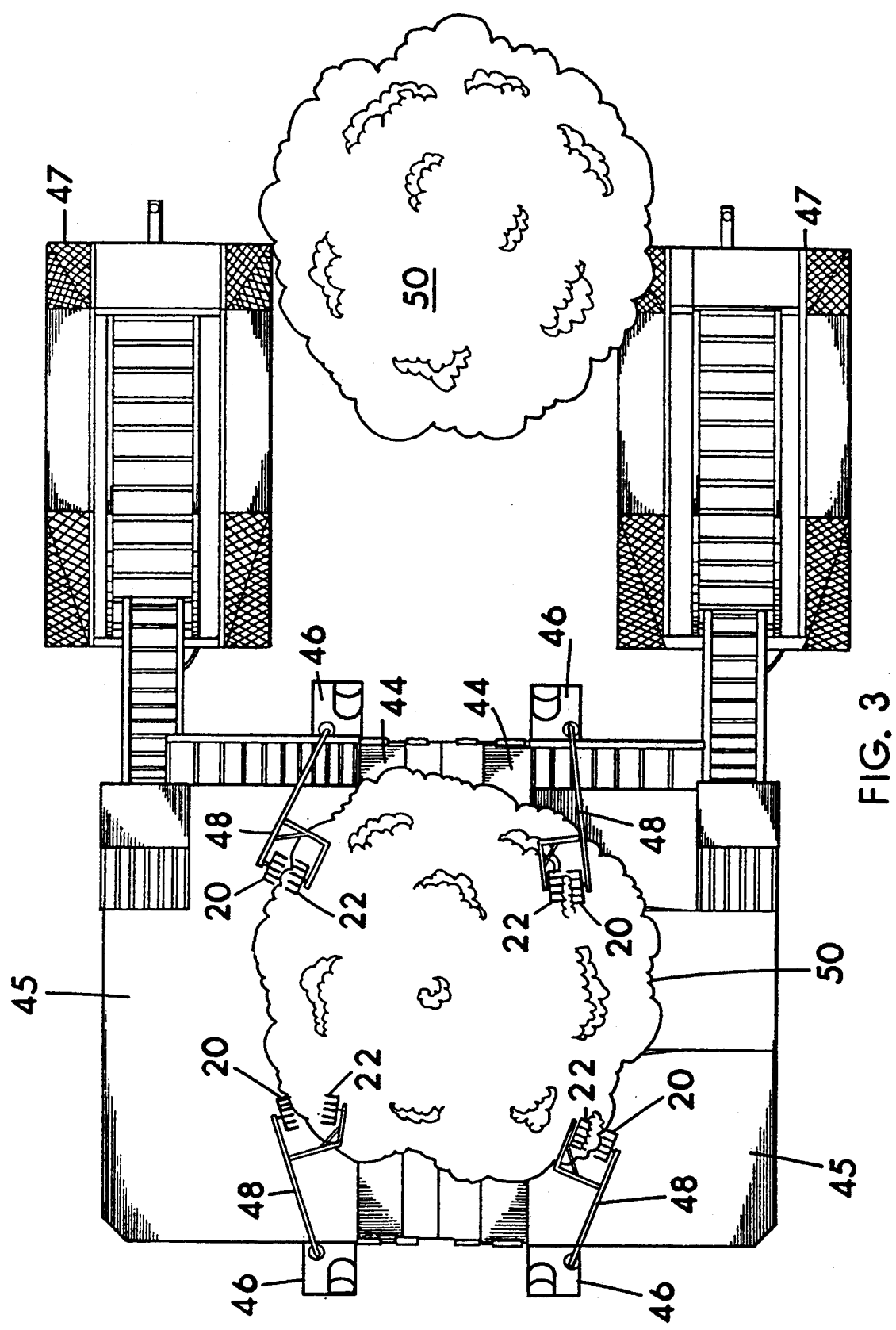
FIG. 3 is a top plan view of a side-by-side pair of powered harvest vehicles having fruit catch platforms each mounted with fruit stripping rake units in accordance with the present invention.
Figure 4:
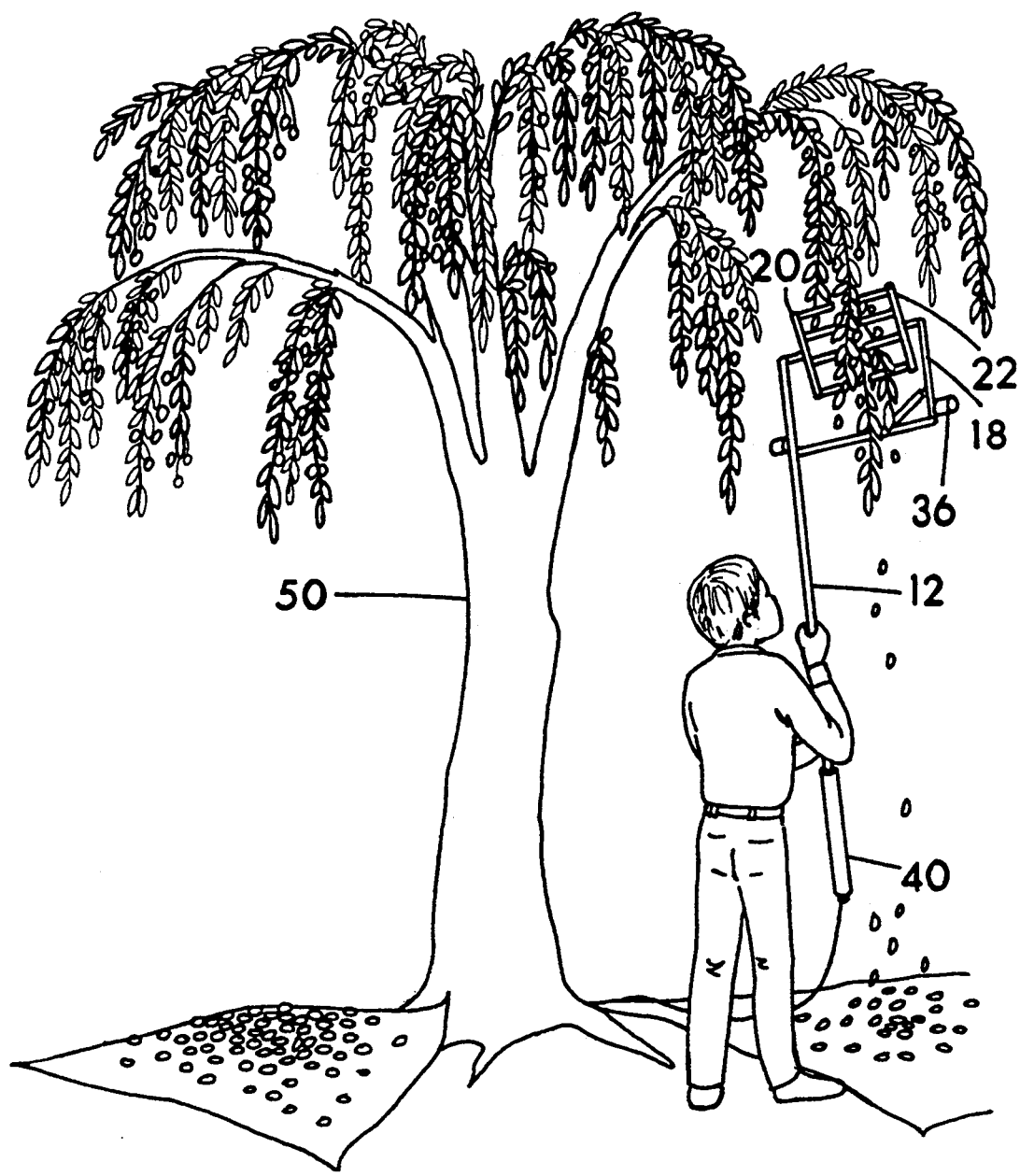
FIG. 4 illustrates an olive tree being harvested in one manner in accordance with the present invention. The olives are shown falling onto tarps on the ground.

The opposing rake members 20 and 22 as shown in FIGS. 1 and 2, may be arranged on a hand held support rod 12, or as previously stated and shown in FIG. 3, may be mounted to drivable motor powered harvesting vehicles 44 having sloped catch platforms 45 and fruit off-load conveyors and storage hoppers 47. On a harvest vehicle having a catch platform 45, the pairs of opposing rake members 20 and 22 would be attached to power operated elongated boom supports 48 which would include capabilities for moving the opposing rake members 20 and 22 into widely varying positions around a tree. The boom supports 48 could be telescopic or otherwise extendable and retractable, and should be pivotable so as to be able to provide sideways repositioning, and the booms 48 should be able to change angles up and down so the operator may reach a large portion of the tree 50 being harvested with the opposing rakes supported on the end of the boom. The movements in the boom 48 should be provided by powering devices such as motors and linear extendable actuators. An operator's seat with movement controls 46 may best be provided adjacent each boom 48 supporting the opposing rakes. Multiple booms 48 may be used on a single harvest vehicle as indicated in FIG. 3, and this would require multiple human operators, one for each seat with movement control station 46.

Boom 48 supporting opposing rakes 20 and 22 may be mounted on harvest vehicles absent catch platforms, and although this may render some advantages over hand held units such as that shown in FIG. 2 which may fatigue the manual operator, catch platforms and storage hoppers are preferred for high production harvesting.

Although I have very specifically described my invention in various forms, it should be understood that the specific details are given for example. Many minor changes in the specifics described may clearly be made without departing from the true scope of my invention.

What I claim as my invention is:

1. A fruit harvesting apparatus, comprising,
    an elongated rod having a first end and an oppositely disposed second end,
    a first rake member movably attached to said rod adjacent said first end of said rod,
    said first rake member having a plurality of tines extending therefrom,
    an extension arm affixed to said rod adjacent said first end of said rod,
    a second rake member movably attached to said extension arm,
    said second rake member having a plurality of tines extending therefrom and in the general direction of the tines of said first rake member,
    a moveable joint in said extension arm providing means for said extension arm and thus said second rake member to be moved toward and away of said first rake member for allowing placement of fruit bearing branches between said first and second rake members, controllable means for causing movement of said extension arm for moving said first and second rake members relative to one another,
    powering means connected to said first and second rake members for causing movement in said rake members and thus the tines relative to said rod and said extension arm for stripping fruit from branches positioned and stabilized between said first and second rake members.

2. A fruit harvesting apparatus including a drivable powered harvest vehicle having means for moving through an orchard; means for catching fruit falling from a tree; and means for containerizing caught fruit; elongated support means attached to said vehicle for supporting a movably affixed first rake member and a movably affixed second rake member, said first rake member having a plurality of extending tines, said second rake member having a plurality of tines extending therefrom and in the general direction of the tines of said first rake member,
    moveable joint means for providing means for said first rake member and said second rake member to be spread apart from one another to allow placement thereof on differing sides of a fruit bearing branch and then to be brought toward one another with the tines of the rake members opposing one another and engaging the branch whereat the branch will be generally stabilized between said first and second rake members,
    controllable powering means for moving said first and second rake members apart and toward one another via said moveable joint means,
    powering means connected to said first rake member for causing oscillating movement in said first rake member and thus the tines thereon for stripping fruit from a branch,
    powering means connected to said second rake member for causing oscillating movement in said second rake member and thus the tines thereon for stripping fruit from a branch in cooperative functioning with said first rake member for stripping fruit from a branch positioned and stabilized between said first and second rake members with stripped fruit falling onto said means for catching fruit and then being containerized by said means for containerizing of said vehicle.

* * * * *